US009090252B2

(12) United States Patent
Mitsutani

(10) Patent No.: US 9,090,252 B2
(45) Date of Patent: Jul. 28, 2015

(54) VEHICLE AND VEHICLE CONTROL METHOD

(71) Applicant: Noritake Mitsutani, Toyota (JP)

(72) Inventor: Noritake Mitsutani, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 96 days.

(21) Appl. No.: 13/893,921

(22) Filed: May 14, 2013

(65) Prior Publication Data

US 2013/0311021 A1 Nov. 21, 2013

(30) Foreign Application Priority Data

May 15, 2012 (JP) ................................. 2012-111416

(51) Int. Cl.
| | |
|---|---|
| B60W 20/00 | (2006.01) |
| B60K 6/445 | (2007.10) |
| F01N 9/00 | (2006.01) |
| B60W 10/06 | (2006.01) |

(52) U.S. Cl.
CPC ............... *B60W 20/00* (2013.01); *B60K 6/445* (2013.01); *B60W 10/06* (2013.01); *B60W 20/1082* (2013.01); *B60W 2510/244* (2013.01); *B60W 2710/0694* (2013.01); *Y02T 10/6239* (2013.01); *Y10S 903/903* (2013.01)

(58) Field of Classification Search
CPC ..... B60W 20/00; B60W 10/06; B60W 10/08; B60K 6/445; B60K 6/28; B60K 6/365; F02D 41/0055; F02D 41/068; B60L 11/123; B60L 1/04; F01N 9/00; F01N 3/2013; F01N 3/0205; F01N 3/2046
USPC ................... 701/22; 123/406.23; 180/65.245; 60/284, 286, 274
See application file for complete search history.

(56) References Cited

U.S. PATENT DOCUMENTS

| | | | | |
|---|---|---|---|---|
| 5,492,190 | A * | 2/1996 | Yoshida .................... | 180/65.245 |
| 5,600,947 | A * | 2/1997 | Cullen ............................ | 60/274 |
| 5,609,024 | A * | 3/1997 | Fujiwara et al. ................ | 60/284 |
| 2002/0092295 | A1 | 7/2002 | Suzuki et al. | |
| 2003/0074892 | A1* | 4/2003 | Miura ............................. | 60/284 |
| 2010/0146943 | A1* | 6/2010 | Muramatsu et al. ............ | 60/286 |
| 2010/0242446 | A1* | 9/2010 | Granqvist ....................... | 60/286 |
| 2010/0251996 | A1* | 10/2010 | Akimoto .................. | 123/406.23 |
| 2010/0256849 | A1* | 10/2010 | Akimoto ......................... | 701/22 |
| 2010/0280698 | A1* | 11/2010 | Ichikawa ....................... | 701/22 |
| 2011/0307132 | A1* | 12/2011 | Hashimoto .................... | 701/22 |
| 2012/0072062 | A1* | 3/2012 | Ando ............................. | 701/22 |

FOREIGN PATENT DOCUMENTS

| | | |
|---|---|---|
| CN | 102295001 A | 12/2011 |
| JP | A-11-022503 | 1/1999 |

(Continued)

*Primary Examiner* — Tuan C. To
*Assistant Examiner* — Yuri Kan
(74) *Attorney, Agent, or Firm* — Oliff PLC

(57) ABSTRACT

A vehicle includes: an electrical storage device configured to supply electric power to a power receiving system outside the vehicle; a power generating device configured to supply electric power to the electrical storage device and the power receiving system; an engine that is a power source of the power generating device and that has a catalyst for purifying exhaust gas; and a control device. The control device is configured to control the vehicle such that a catalyst temperature becomes a first target value when there is a request to warm up the catalyst while the vehicle is travelling, and the control device configured to control the vehicle such that catalyst temperature becomes a second target value different from the first target value when there is a request to warm up the catalyst while electric power is being supplied to the power receiving system.

9 Claims, 7 Drawing Sheets

(56) References Cited

FOREIGN PATENT DOCUMENTS

| JP | A-2000-234539 | 8/2000 |
| JP | A-2001-231106 | 8/2001 |
| JP | 2002285878 A | 10/2002 |
| JP | A-2006-121844 | 5/2006 |
| JP | A-2008-155682 | 7/2008 |
| JP | A-2011-220120 | 11/2011 |
| JP | A-2012-40915 | 3/2012 |

* cited by examiner

VEHICLE AND VEHICLE CONTROL METHOD

INCORPORATION BY REFERENCE

The disclosure of Japanese Patent Application No 2012-111416 filed on May 15, 2012 including the specification, drawings and abstract is incorporated herein by reference in its entirety.

BACKGROUND OF THE INVENTION

1. Field of the Invention

The invention relates to a vehicle that includes an engine and a power generating device that is able to supply electric power to a device outside of the vehicle, and a vehicle control method.

2. Description of Related Art

Japanese Patent Application Publication No, 2001-231106 (JP 2001-231106 A) describes a vehicle that supplies electric power to an external load by driving a generator with the use of an engine.

A catalyst provided in an exhaust pipe of the engine needs to be warmed up such that the temperature of the catalyst falls within a predetermined temperature range required to purify exhaust gas. However, if the catalyst is warmed up in a similar manner between the case where the engine is operated at the time when the generator is driven and the case where the engine is operated at the time when the vehicle is travelling, energy may be unnecessarily consumed. JP 2001-231106 A does not consider this point.

SUMMARY OF THE INVENTION

The invention provides a vehicle and a vehicle control method that appropriately control the temperature of a catalyst on the basis of a state of the vehicle.

A first aspect of the invention provides a vehicle. The vehicle includes: an electrical storage device configured to supply electric power to a power receiving system outside the vehicle; a power generating device configured to supply electric power to the electrical storage device and the power receiving system; an engine that is a power source of the power generating device and that has a catalyst for purifying exhaust gas; and a control device. The control device is configured to, when there is a request to warm up the catalyst while the vehicle is travelling, control the vehicle such that a catalyst temperature becomes a first target value, and, when there is a request to warm up the catalyst while electric power is being supplied to the power receiving system, control the vehicle such that catalyst temperature becomes a second target value different from the first target value.

In the vehicle, the second target value may be lower in temperature than the first target value.

In the vehicle, the first target value may be the catalyst temperature required to purify the exhaust gas in an amount corresponding to an upper limit of an intake air flow rate of the engine while the vehicle is travelling.

In the vehicle, the second target value may be the catalyst temperature required to purify the exhaust gas in an amount corresponding to an upper limit of an intake air flow rate of the engine while electric power is being supplied to the power receiving system.

In the vehicle, the control device may be configured to determine that there is a request to warm up the catalyst when a state of charge of the electrical storage device is lower than a threshold.

In the vehicle, the control device may be configured to determine that there is a request to warm up the catalyst when a low-load state of the engine continues until a lapse of time after an end of warm-up of the catalyst is longer than or equal to a threshold.

The vehicle may further include an electric motor configured to drive the vehicle. The control device may be configured to determine that there is a request to warm up the catalyst when there is a request to start the engine while the vehicle is driven with the use of the electric motor in a state where the engine is stopped.

The vehicle may further include a detecting unit configured to detect the catalyst temperature. The control device may be configured to determine that there is a request to warm up the catalyst when the engine is in operation and the catalyst temperature detected by the detecting unit is lower than a threshold.

In the vehicle, the power generating device may be a first rotating electrical machine. The vehicle may include: a drive wheel; a second rotating electrical machine configured to rotate the drive wheel; and a power transmission device configured to mechanically couple three elements, that is, an output shaft of the engine, a rotary shaft of a first rotating electrical machine that is the power generating device and a rotary shaft of the second rotating electrical machine, to each other, and to set any one of the three elements as a reaction element to thereby transmit power between the other two elements.

A second aspect of the invention provides a vehicle control method that is used in a vehicle including: an electrical storage device configured to supply electric power to an external power receiving system; a power generating device configured to supply electric power to the electrical storage device and the power receiving system; and an engine that is a power source of the power generating device and that has a catalyst. The vehicle control method includes: when there is a request to warm up the catalyst while the vehicle is travelling, controlling the vehicle such that a catalyst temperature becomes a first target value; and, when there is a request to warm up the catalyst while electric power is being supplied to the power receiving system, controlling the vehicle such that the catalyst temperature becomes a second target value different from the first target value.

With the above configuration, when there is a request to warm up the catalyst while the vehicle is travelling, the vehicle is controlled such that a catalyst temperature becomes a first target value. Meanwhile, when there is a request to warm up the catalyst while electric power is being supplied to the power receiving system, the vehicle is controlled such that the catalyst temperature becomes a second target value different from the first target value. Thus, it is possible to control the catalyst temperature such that the catalyst temperature becomes an appropriate temperature in each of the time when the vehicle is travelling and the time when electric power is being supplied to the power receiving system. Therefore, it is possible to suppress wasteful consumption of energy at the time when the catalyst is warmed up. Thus, it is possible to appropriately control the temperature of the catalyst on the basis of the state of the vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
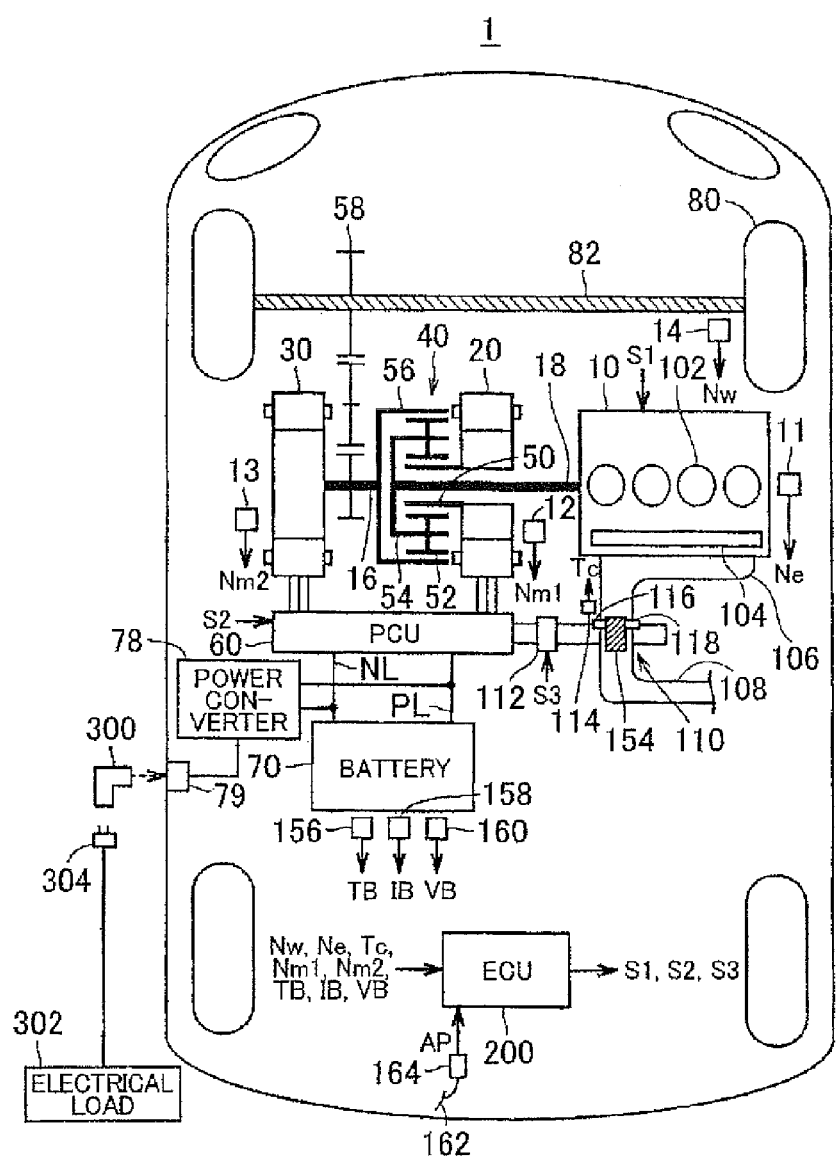
FIG. 1 is an overall block diagram of a vehicle according to an embodiment.

Hereinafter, an embodiment of the invention will be described with reference to the accompanying drawings. In the following description, like reference numerals denote the like components. The names and functions of those components are also the same. Thus, the detailed description thereof will not be repeated.

The overall block diagram of a hybrid vehicle 1 (in the following description, simply referred to as vehicle 1) according to the present embodiment will be described with reference to FIG. 1. The vehicle 1 includes an engine 10, a drive shaft 16, a first motor generator (or a first rotating electrical machine, hereinafter, referred to as first MG) 20, a second motor generator (or a second rotating electrical machine, hereinafter, referred to as second MG) 30, a power split unit 40, a speed reducer 58, a power control unit (PCU) 60, a battery 70, a power converter 78, a socket 79, drive wheels 80 and an electronic control unit (ECU) 200.

The vehicle 1 travels by using driving force that is output from at least one of the engine 10 and the second MG 30. Power that is generated by the engine 10 is split into two-line powers by the power split unit 40. One of the two-line powers is transmitted to the drive wheels 80 via the speed reducer 58. The other-line power is transmitted to the first MG 20.

The first MG 20 and the second MG 30 each are, for example, a three-phase AC motor/generator. The first MG 20 and the second MG 30 are driven by the PCU 60.

The first MG 20 has the function of a generator for generating electric power using the power of the engine 10, split by the power split unit 40, and then charging the battery 70 via the PCU 60, or supplying electric power to an external electrical load (described later). The first MG 20 rotates a crankshaft 18 that is an output shaft of the engine 10 upon reception of electric power from the battery 70. Thus, the first MG 20 has the function of a starter for starting the engine 10.

The second MG 30 has the function of a drive motor for applying driving force to the drive wheels 80 by using at least one of electric power stored in the battery 70 and electric power generated by the first MG 20. The second MG 30 has the function of a generator for charging the battery 70 via the PCU 60 by using electric power generated through regenerative braking.

The engine 10 is, for example, an internal combustion engine, such as a gasoline engine and a diesel engine.

The engine 10 includes a plurality of cylinders 102, a fuel injection device 104 that supplies fuel to each of the plurality of cylinders 102, an exhaust manifold 106, an exhaust passage 108, an electrically heated catalyst (EHC) 110 and a catalyst temperature sensor 114. The number of the cylinders 102 of the engine 10 may be one or more.

The fuel injection device 104 injects fuel in an appropriate amount at appropriate timing to each cylinder or stops injection of fuel to each cylinder on the basis of a control signal S1 from the ECU 200. A fuel injection amount of the fuel injection device 104 is adjusted by an injection duration.

One end portion of the exhaust passage 108 is connected to the exhaust manifold 106. The other end portion of the exhaust passage 108 is connected to a muffler (not shown). The EHC 110 is provided in the exhaust passage 108.

The EHC 110 includes a catalyst 154, a positive electrode 116 and a negative electrode 118. The catalyst 154 purifies exhaust gas. The positive electrode 116 and the negative electrode 118 are used to supply current to the catalyst 154. The EHC 110 is not specifically limited as long as the EHC 110 is configured to raise the temperature of the catalyst 154 by supplying current to the catalyst 154 with the use of the electrodes 116, 118, and various configurations may be used.

In the present embodiment, description will be made on an example in which the EHC uses the electrodes 116, 118 as a device for heating the catalyst 154. The device for heating the catalyst 154 is not specifically limited to this configuration. For example, the catalyst 154 may be heated by raising the temperature of exhaust gas through an increase in the fuel injection amount or retardation of ignition timing.

The catalyst 154 is formed into a cylindrical shape having a honeycomb structure. The positive electrode 116 is provided on the outer periphery of the catalyst 154. The negative electrode 118 has the same shape as the positive electrode 116, and is provided at a location at which the negative electrode 118 faces the positive electrode 116 via the catalyst 154. The above-described shape of the catalyst 154 is one example, and is not limited to the cylindrical shape.

Exhaust gas that is emitted from the engine 10 is purified by the catalyst 154, and is emitted to the outside of the vehicle. The catalyst 154 exhibits purification action when the catalyst 154 is warmed up to a specific temperature range. The catalyst 154 is, for example, a three-way catalyst.

The PCU 60 and the EHC 110 are connected to each other by a positive-electrode line and a negative-electrode line. The EHC 110 is supplied with electric power from the battery 70 via the PCU 60 and electric power generated by the first MG 20. A connection between the battery 70 and the EHC 110 is not limited to the one shown in FIG. 1.

A power supply circuit 112 that incorporates a relay is provided between the PCU 60 and the EHC 110. The power supply circuit 112 switches an electrical connection state between the EHC 110 and the PCU 60 on the basis of a control signal S3 from the ECU 200. When the relay incorporated in the power supply circuit 112 is closed, the EHC 110 and the PCU 60 are connected, the voltage is applied between the positive electrode 116 and the negative electrode 118 in the EHC 110, and the positive electrode 116 and the negative electrode 118 are supplied with current. When the positive electrode 116 and the negative electrode 118 are supplied with current, Joule heat is produced in the catalyst 154 in the EHC 110, and the catalyst 154 in the EHC 110 is heated.

When the relay incorporated in the power supply circuit 112 is opened, connection between the EHC 110 and the PCU 60 is interrupted, and supply of current to the positive electrode 116 and the negative electrode 118 is stopped. In this way, the ECU 200 controls the power supply circuit 112. Thus, the amount of current supplied to the catalyst 154 in the EHC 110 is controlled. The ECU 200 may be configured to change electric power (voltage and/or current) that is supplied to the EHC 110 by controlling the PCU 60. Alternatively, the ECU 200 may be configured to change electric power that is supplied to the EHC 110 by executing duty control over the relay incorporated in the power supply circuit 112. The power supply circuit 112 may include a circuit that changes electric power supplied to the EHC 110.

The catalyst temperature sensor 114 shown in FIG. 1 detects the temperature Tc of the catalyst 154 (hereinafter, referred to as catalyst temperature) in the EHC 110. The catalyst temperature sensor 114 transmits a signal indicating the detected catalyst temperature Tc to the ECU 200.

The catalyst temperature Tc may be directly detected by the catalyst temperature sensor 114. Alternatively, the catalyst temperature Tc may be configured to be estimated by the ECU 200 on the basis of a temperature of a member near the EHC 110, an exhaust gas temperature upstream of the EHC 110, an exhaust gas temperature downstream of the EHC 110 or an operating history of the engine 10.

The engine 10 has an engine rotation speed sensor 11. The engine rotation speed sensor 11 detects a rotation speed Ne of the crankshaft 18 of the engine 10 (hereinafter, referred to as engine rotation speed). The engine rotation speed sensor 11 transmits a signal indicating the detected engine rotation speed Ne to the ECU 200.

The power split unit 40 mechanically couples the three elements, that is, the drive shaft 16 for rotating the drive wheels 80, the crankshaft 18 of the engine 10 and the rotary shaft of the first MG 20. The power split unit 40 sets any one of the above-described three elements for a reaction element to thereby make it possible to transmit power between the other two elements. The rotary shaft of the second MG 30 is coupled to the drive shaft 16.

The power split unit 40 is a planetary gear mechanism that includes a sun gear 50, pinion gears 52, a carrier 54 and a ring gear 56. The pinion gears 52 are in mesh with the sun gear 50 and the ring gear 56. The carrier 54 supports the pinion gears 52 such that the pinion gears 52 are rotatable, and is coupled to the crankshaft 18 of the engine 10. The sun gear 50 is coupled to the rotary shaft of the first MG 20. The ring gear 56 is coupled to the rotary shaft of the second MG 30 and the speed reducer 58 via the drive shaft 16.

The speed reducer 58 transmits power from the power split unit 40 or the second MG 30 to the drive wheels 80. In addition, the speed reducer 58 transmits reaction force from a road surface, received by the drive wheels 80, to the power split unit 40 or the second MG 30.

The PCU 60 includes a plurality of switching elements. The PCU 60 converts direct-current power stored in the battery 70 to alternating-current power for driving the first MG 20 and the second MG 30 by controlling on/off operations of the switching elements. The PCU 60 includes a converter and an inverter (both are not shown) that are controlled on the basis of a control signal S2 from the ECU 200. The converter steps up the voltage of direct-current power received from the battery 70, and outputs the resultant direct-current power to the inverter. The inverter converts direct-current power, output from the converter, to alternating-current power, and outputs the alternating-current power to the first MG 20 and/or the second MG 30. Thus, the first MG 20 and/or the second MG 30 are driven by using electric power stored in the battery 70. Meanwhile, the inverter converts alternating-current power, generated by the first MG 20 and/or the second MG 30, to direct-current power, and outputs the direct-current power to the converter. The converter steps down the voltage of direct-current power, output from the inverter, and outputs the resultant direct-current power to the battery 70. Thus, the battery 70 is charged with electric power generated by the first MG 20 and/or the second MG 30. The converter may be omitted.

The battery 70 is an electrical storage device, and is a rechargeable direct-current power supply. The battery 70 is, for example, a secondary battery, such as a nickel metal hydride battery and a lithium ion battery. The voltage of the battery 70 is, for example, about 200 V. The battery 70 is charged with electric power generated by the above-described first MG 20 and/or second MG 30. Other than the above, the battery 70 may be charged with electric power that is supplied from an external power supply (not shown). The battery 70 is not limited to the secondary battery. The battery 70 may be the one that is able to produce direct-current voltage, such as a capacitor, a solar battery and a fuel cell.

The battery 70 has a battery temperature sensor 156, a current sensor 158 and a voltage sensor 160.

The battery temperature sensor 156 detects a battery temperature 143 of the battery 70. The battery temperature sensor 156 transmits a signal indicating the battery temperature TB to the ECU 200.

The current sensor 158 detects a current 1B of the battery 70. The current sensor 158 transmits a signal indicating the current IB to the ECU 200.

The voltage sensor 160 detects a voltage VB of the battery 70. The voltage sensor 160 transmits a signal indicating the voltage VB to the ECU 200.

The ECU 200 estimates the state of charge (SOC) of the battery 70 on the basis of the current 113, voltage VB and battery temperature TB of the battery 70. The ECU 200, for example, may estimate an open circuit voltage (OCV) on the basis of the current 1B, the voltage VB and the battery temperature TB, and may estimate the SOC of the battery 70 on the basis of the estimated OCV and a predetermined map. Alternatively, the ECU 200, for example, may estimate the SOC of the battery 70 by accumulating a charge current and discharge current of the battery 70.

The power converter 78 converts electric power that is supplied from an external power supply (not shown) and supplies the converted electric power to the battery 70 when a plug connected to the external power supply is attached to the socket 79 of the vehicle 1. Alternatively, the power converter 78 converts electric power of the battery 70 or electric power generated in the first MG 20 and supplies electric power to an external electrical load 302 when an adapter 300 is attached to the socket 79 of the vehicle 1. The power converter 78, for example, converts the direct-current power of the battery 70 to alternating-current power. The power converter 78, for example, converts alternating-current power (three phase), generated in the first MG 20, to alternating-current power (single phase) suitable for the electrical load 302.

A plug 304 is connected to the adapter 300. The plug 304 is connected to the electrical load 302 that is an external power receiving system. In the present embodiment, description will be made on an example in which the electrical load 302 that is the power receiving system outside the vehicle 1 is, for example, a home appliance. However, the electrical load 302 is not specifically limited to the home appliance. For example, the power receiving system outside the vehicle 1 may be a building, such as a house, or a vehicle, such as an electric vehicle.

When the adapter 300 is connected to the socket 79 of the vehicle 1 and the electrical load 302 is connected to the adapter 300, the ECU 200 selects a power generation mode from among a plurality of control modes. The power generation mode is a control mode that is selected when electric power of the battery 70 or electric power that is generated in the first MG 20 is supplied to the external electrical load 302.

When the power generation mode is selected as the control mode, the ECU 200 controls the power converter 78 such that electric power of the battery 70 or electric power that is generated in the first MG 20 is converted and then the converted electric power is supplied to the electrical load 302. In the present embodiment, the ECU 200 is configured to select the power generation mode when the adapter 300 is connected to the socket 79 of the vehicle 1; instead, the ECU 200 may select the power generation mode in response to a request to select the power generation mode on the basis of user's operation. The ECU 200 may, for example, select the power generation mode when a switch for selecting the power generation mode is set to an on state by the user.

In the case where the SOC of the battery 70 is larger than a threshold when the power generation mode is selected, the ECU 200 controls the PCU 60 such that only electric power of the battery 70 is supplied to the electrical load 302 in a state where the engine 10 is stopped. When the SOC of the battery 70 becomes lower than or equal to a lower limit value corresponding to the power generation mode, the ECU 200 controls the engine 10 such that the engine 10 is started. As a result of the start of the engine 10, electric power of the battery 70 and electric power that is generated in the first MG 20 are supplied to the electrical load 302.

A positive electrode terminal of the power converter 78 is connected to a power supply line PL that connects a positive electrode terminal of the PCU 60 to a positive electrode terminal of the battery 70. A negative electrode terminal of the power converter 78 is connected to a ground line NL that connects a negative electrode terminal of the PCU 60 to a negative electrode terminal of the battery 70.

A first resolver 12 is provided in the first MG 20. The first resolver 12 detects a rotation speed Nm1 of the first MG 20. The first resolver 12 transmits a signal indicating the detected rotation speed Nm1 to the ECU 200.

A second resolver 13 is provided in the second MG 30. The second resolver 13 detects a rotation speed Nm2 of the second MG 30. The second resolver 13 transmits a signal indicating the detected rotation speed Nm2 to the ECU 200.

A wheel speed sensor 14 is provided on a drive shaft 82 that couples the speed reducer 58 to the drive wheels 80. The wheel speed sensor 14 detects a rotation speed Nw of the drive wheels 80. The wheel speed sensor 14 transmits a signal indicating the detected rotation speed Nw to the ECU 200. The ECU 200 calculates a vehicle speed V on the basis of the received rotation speed Nw. The ECU 200 may be configured to calculate the vehicle speed V on the basis of the rotation speed Nm2 of the second MG 30 instead of the rotation speed Nw.

An accelerator pedal 162 is provided at a driver seat side in a vehicle cabin. A pedal stroke sensor 164 is provided at the accelerator pedal 162. The pedal stroke sensor 164 detects a stroke amount AP of the accelerator pedal 162. The pedal stroke sensor 164 transmits a signal indicating the stroke amount AP to the ECU 200. Instead of the pedal stroke sensor 164, an accelerator pedal depression force sensor for detecting a depression force of an occupant on the accelerator pedal 162 may be used.

The ECU 200 generates the control signal S1 for controlling the engine 10, and outputs the generated control signal S1 to the engine 10. The ECU 200 generates the control signal S2 for controlling the PCU 60, and outputs the generated control signal S2 to the PCU 60. The ECU 200 generates the control signal S3 for controlling the power supply circuit 112, and outputs the generated control signal S3 to the power supply circuit 112.

The ECU 200 controls an overall hybrid system, that is, charging and discharging of the battery 70 and the operations of the engine 10, first MG 20 and second MG 30, by controlling the engine 10, the PCU 60, and the like, such that the vehicle 1 is able to operate most efficiently.

The ECU 200 calculates a required power Pv corresponding to the stroke amount AP of the accelerator pedal 162. The ECU 200 controls the torque of the first MG 20, the torque of the second MG 30 and the power of the engine 10 on the basis of the calculated required power Pv.

In the vehicle 1 having the above-described configuration, when the efficiency of the engine 10 is low at the time of a start, during a low-speed travel, or the like, the vehicle 1 is caused to travel only with the use of the second MG 30.

During a normal travel, for example, the power of the engine 10 is split into two-line powers by the power split unit 40. The drive wheels 80 are directly driven by one of the two-line powers. The first MG 20 is driven by the other one of the two-line powers to generate electric power. At this time, the ECU 200 drives the second MG 30 using the generated electric power. In this way, by driving the second MG 30, drive assist for the drive wheels 80 is carried out.

At the time of deceleration of the vehicle 1, the second MG 30 that is driven by the rotation of the drive wheels 80 functions as a generator, and regenerative braking is carried out. Electric power recovered by regenerative braking is stored in the battery 70. When the SOC of the battery 70 decreases and charging is particularly required, the ECU 200 increases the power of the engine 10 to increase the amount of electric power that is generated by the first MG 20. Thus, the SOC of the battery 70 is increased. The ECU 200 may execute control for increasing driving force from the engine 10 where necessary even during a low-speed travel. For example, this is the case where charging of the battery 70 is required as described above, the case where an auxiliary, such as an air conditioner, is driven, the case where the temperature of coolant of the engine 10 or the catalyst 154 is raised to a predetermined temperature, or the like.

The ECU 200 selects a travel mode as the control mode of the vehicle 1 at the time when the vehicle 1 is travelling. The ECU 200, for example, may select the travel mode when a shift position is a travel position or may select the travel mode at the time when the above-described power generation mode is cancelled. The ECU 200 exclusively selects the travel mode or the power generation mode.

In the vehicle 1 having the above-described configuration, it is required to warm up the catalyst 154 provided in the exhaust passage 108 of the engine 10 such that the temperature of the catalyst 154 falls within a predetermined temperature range required to purify exhaust gas. However, if the catalyst 154 is warmed up in a similar manner in the case where the engine 10 is operated at the time when the power generation mode is selected and in the case where the engine 10 is operated at the time when the vehicle 1 is travelling, energy may be unnecessarily consumed.

In the present embodiment, when the vehicle 1 is travelling and the catalyst 154 is required to be warmed up, the ECU 200 controls the vehicle 1 such that the temperature Tc of the catalyst 154 becomes a first target value Tct(1). On the other hand, when electric power is supplied to the external electrical load 302 that is the power receiving system and the catalyst 154 is required to be warmed up, the ECU 200 controls the vehicle 1 such that the temperature Tc of the catalyst 154 becomes a second target value Tct(2) different from the first target value Tct(1). In the present embodiment, the second target value Tct(2) is lower in temperature than the first target value Tct(1).

Figure 2:
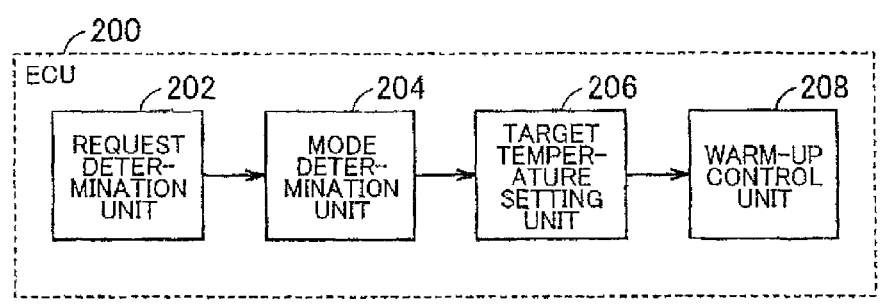
FIG. 2 is a functional block diagram of an ECU mounted on the vehicle according to the embodiment.

FIG. 2 shows a functional block diagram of the ECU 200 mounted on the vehicle 1 according to the present embodiment. The ECU 200 includes a request determination unit 202, a mode determination unit 204, a target temperature setting unit 206 and a warm-up control unit 208.

The request determination unit 202 determines whether there is a request to warm up the catalyst 154. The request determination unit 202 may determine that there is a request to warm up the catalyst 154, for example, in the case where there is a request to start the engine 10 when the vehicle 1 is caused to travel with the use of the second MG 30 in a state where the engine 10 is stopped (hereinafter, referred to as during EV travel).

The request determination unit 202 may determine that there is a request to start the engine 10 (that is, there is a request to warm up the catalyst 154), for example, in the case where the SOC of the battery 70 is lower than a threshold SOC(0) during EV travel. The threshold SOC(0) is a lower limit of the SOC curing EV travel and is a threshold of the SOC for starting the engine 10 in a stopped state.

Alternatively, the request determination unit 202, for example, may determine that there is a request to warm up the catalyst 154 when the duration of a low-load state of the engine 10 is longer than or equal to a predetermined period of time after completion of warm-up of the catalyst 154. The low load state of the engine may be a state where a load amount L of the engine is smaller than a threshold L(0) or a state where the intake air flow rate of the engine 10 is smaller than a threshold.

The request determination unit 202, for example, may determine that there is a request to warm up the catalyst 154 when the temperature Tc of the catalyst 154 is lower than the threshold Tc(0) in a state where the engine 10 is in operation.

The request determination unit 202, for example, may set a request determination flag to an on state when the request determination unit 202 determines that there is a request to warm up the catalyst 154.

When the request determination unit 202 determines that there is a warm-up request, the mode determination unit 204 determines which control mode is selected from between the travel mode and the power generation mode. The mode determination unit 204, for example, sets a travel mode determination flag to an on state when the travel mode is selected. On the other hand, the mode determination unit 204 may set a power generation mode determination flag to an on state when the power generation mode is selected.

When the request determination unit 202 determines that there is a warm-up request, the target temperature setting unit 206 sets a target temperature Tet of the catalyst 154 on the basis of the determination result of the mode determination unit 204. When it is determined that there is a request to warm up the catalyst 154 while the travel mode is selected, the target temperature setting unit 206 sets the first target value Tct(1) for the target temperature Tct.

On the other hand, when it is determined that there is a request to warm up the catalyst 154 while the power generation mode is selected, the target temperature setting unit 206 sets the second target value Tct(2) for the target temperature Tct.

Figure 3:
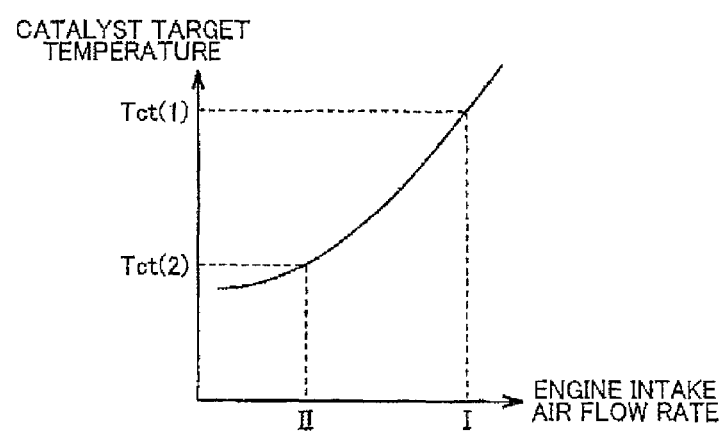
FIG. 3 is a graph that shows the correlation between a target temperature of a catalyst and an intake air flow rate of an engine according to the embodiment.

As shown in FIG. 3, the first target value Tct(1) and the second target value Tct(2) are determined on the basis of a predetermined correlation with respect to an upper limit of the intake air flow rate of the engine 10, which is assumed in each control mode.

The solid line in FIG. 3 indicates the correlation between an upper limit of the intake air flow rate of the engine 10 and a target temperature Tct of the catalyst. The target temperature Tct of the catalyst is a catalyst temperature that is required to purify exhaust gas in an amount produced for an upper limit of the intake air flow rate of the engine 10.

As shown in FIG. 3, the target temperature Tct is higher when the upper limit of the intake air flow rate is large than when the upper limit of the intake air flow rate is small.

The intake air flow rate I shown in FIG. 3 is the upper limit of the intake air flow rate that is assumed in the case where the travel mode is selected. The upper limit of the intake air flow rate that is assumed in the case where the travel mode is selected is, for example, an intake air flow rate in the case where a throttle valve is in a fully open state.

The intake air flow rate II is the upper limit of the intake air flow rate that is assumed in the case where the power generation mode is selected. The upper limit of the intake air flow rate that is assumed in the case where the power generation mode is selected is an intake air flow rate in the case where the output of the power converter is an upper limit. The intake air flow rate II is smaller than the intake air flow rate I. Therefore, the second target value Tct(2) is lower than the first target value Tct(1).

The target temperature setting unit 206, for example, may set the first target value Tct(1) for the target temperature Tct of the catalyst 154 when the request determination flag is in an on state and the travel mode determination flag is in an on state. The target temperature setting unit 206, for example, may set the second target value Tct(2) for the target temperature Tct of the catalyst 154 when the request determination flag is in an on state and the power generation mode determination flag is in an on state.

When it has been determined by the request determination unit 202 that there is a warm-up request and the target temperature Tct has been set by the target temperature setting unit 206, the warm-up control unit 208 executes warm-up control. The warm-up control unit 208 executes warm-up control such that the temperature Tc of the catalyst 154 becomes the target temperature Tct set by the target temperature setting unit 206. The warm-up control unit 208, for example, may execute warm-up control such that the catalyst 154 is heated until the temperature Tc of the catalyst 154, which is detected by the catalyst temperature sensor 114, becomes the target temperature Tct. The warm-up control unit 208, for example, may heat the catalyst 154 through control over the EHC 110. Control over the EHC 110 is as described above.

The warm-up control unit 208 may, instead of or in addition to warm-up control over the catalyst 154 with the use of the EHC 110, execute at least any one of warm-up control by increasing the fuel injection amount of the engine 10 and warm-up control by retarding the ignition timing of the engine 10. The warm-up control unit 208 may assist the torque of the engine 10 by motoring the first MG 20 while warm-up control is being executed.

Alternatively, the warm-up control unit 208 may calculate a duration during which warm-up control is executed (hereinafter, referred to as execution duration) and a threshold of a duration during which the engine 10 is in a low-load state (hereinafter, referred to as a low-load duration) on the basis of the set target temperature Tct, and may execute warm-up control on the basis of the calculated results of them.

When it has been determined by the request determination unit 202 that there is a warm-up request, the warm-up control unit 208 executes warm-up control until the execution duration elapses. The warm-up control unit 208 ends warm-up control when the execution duration has elapsed. The warm-up control unit 208 resumes warm-up control when the low-load duration has elapsed after the end of warm-up control. The warm-up control unit 208, for example, may calculate the execution duration and the low-load duration on the basis of the target temperature Tct set using a map, or the like.

The warm-up control unit 208 calculates the execution duration such that the execution duration in the case where the target temperature Tct is low is shorter than the execution duration in the case where the target temperature Tct is high.

The warm-up control unit 208 calculates the low-load duration such that the low-load duration in the case where the target temperature Tct is low is longer than the low-load duration in the case where the target temperature Tct is high.

In the present embodiment, the request determination unit 202, the mode determination unit 204, the target temperature setting unit 206 and the warm-up control unit 208 each are implemented as the CPU of the ECU 200 executes a program stored in a memory. According to the invention, these units may be implemented by other hardware devices.

Figure 4:
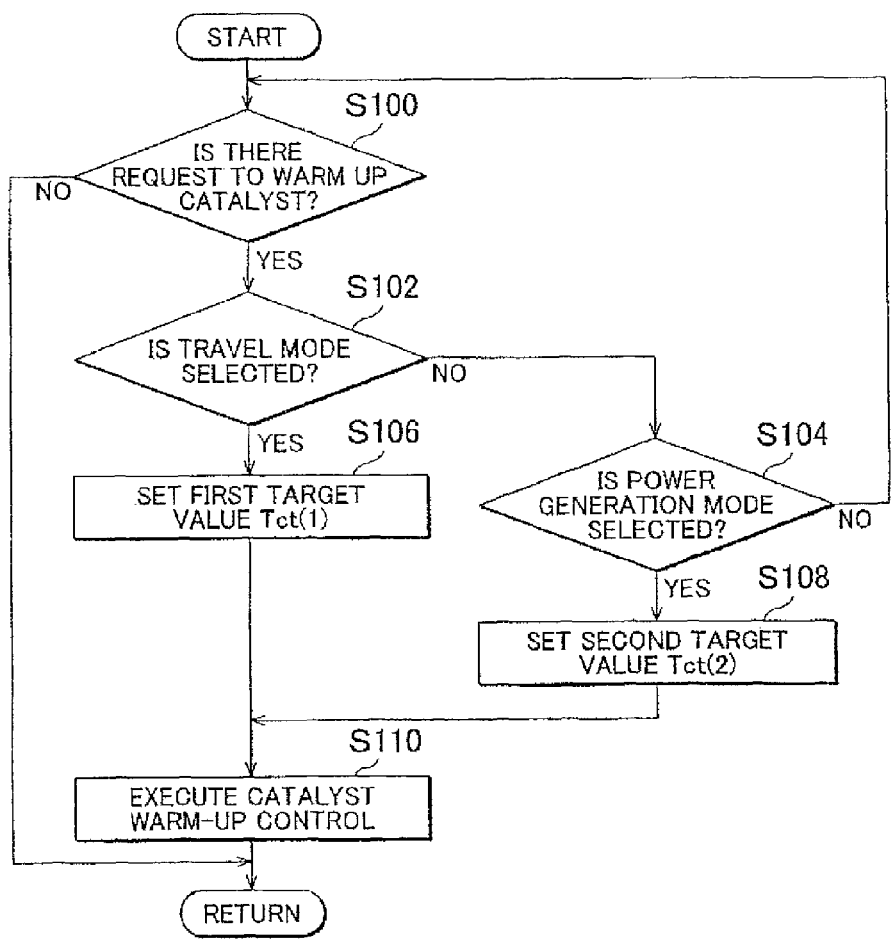
FIG. 4 is a flowchart that shows the control structure of a program that is executed by the ECU mounted on the vehicle according to the embodiment.

The control structure of the program that is executed by the ECU 200 mounted on the vehicle 1 according to the present embodiment will be described with reference to FIG. 4.

The ECU 200 determines in step S100 whether there is a request to warm up the catalyst 154. When there is a warm-up request (YES in step S100), the process proceeds to step S102. When there is no warm-up request (NO in step S100), the process ends.

The ECU 200 determines in step S102 whether the travel mode is selected. When the travel mode is selected (YES in step S102), the process proceeds to step S106. When the travel mode is not selected (NO in step S102), the process proceeds to step S104.

The ECU 200 determines in step S104 whether the power generation mode is selected. When the power generation mode is selected (YES in step S104), the process proceeds to step S108. When the power generation mode is not selected (NO in step S104), the process returns to step S100.

In step S106, the ECU 200 sets the first target value Tct(1) corresponding to the travel mode for the target temperature Tct of the catalyst 154. In step S108, the ECU 200 sets the second target value Tct(2) corresponding to the power generation mode for the target temperature Tct of the catalyst 154. In step S110, the ECU 200 executes warm-up control such that the temperature of the catalyst 154 becomes the set target temperature Tct. Catalyst warm-up control is as described above, so the detailed description thereof is not repeated.

The operation of the ECU 200 mounted on the vehicle 1 according to the present embodiment based on the above-described control structure and flowchart will be described with reference to FIG. 5 to FIG. 8.

<Warm-Up Control 1 when Travel Mode is Selected>

Description will be made on the case where the travel mode is selected as the control mode and the engine 10 is in a stopped state. Warm-up control is executed on the basis of the detected result of the catalyst temperature sensor 114.

In this case, the stopped state of the engine 10 continues, so a state where the temperature Tc of the catalyst 154 is lower than the first target value Tct(1) and the second target value Tct(2) continues. Electric power is consumed in the second MG 30 due to continuation of EV travel, so the SOC of the battery 70 decreases.

Figure 5:
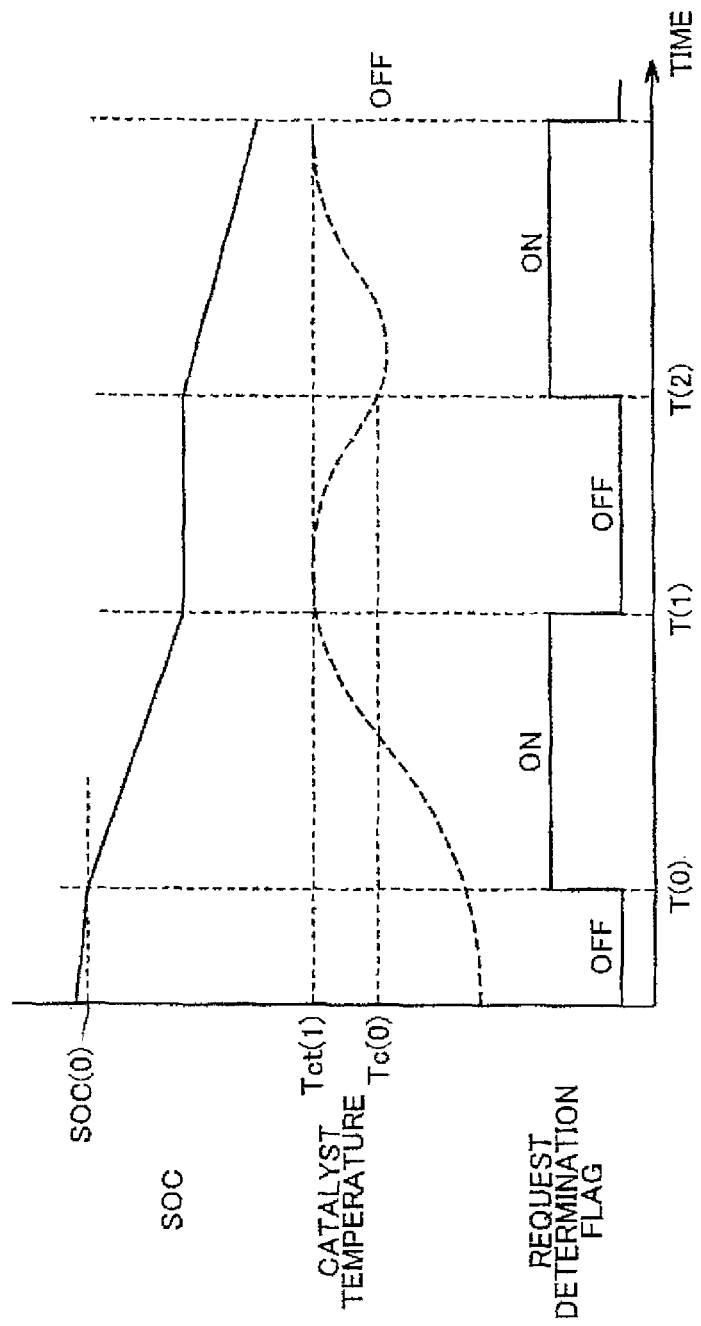
FIG. 5 is a timing chart for illustrating warm-up control that is executed on the basis of a catalyst temperature while a travel mode is selected according to the embodiment.

As shown in FIG. 5, when the SOC of the battery 70 becomes lower than the threshold SOC(0) at time T(0), a start of the engine 10 is required. At this time, there is a request to warm up the catalyst 154 (YES in step S100) and the travel mode is selected (YES in step S102), so the first target value Tct(1) is set for the target temperature Tct of the catalyst 154 (step S106). Then, warm-up control is executed such that the temperature Tc of the catalyst 154 becomes the set target temperature Tct (step S110). The catalyst 154 is heated through execution of warm-up control, so the temperature Tc of the catalyst 154 rises.

After that, when the temperature Tc of the catalyst 154 reaches the first target value Tct(1) at time T(1), warm-up control ends. When warm-up control ends and the low-load state of the engine 10 continues, the temperature Tc of the catalyst 154 decreases with a lapse of time due to heat radiation.

When the temperature Tc of the catalyst 154 becomes lower than a predetermined lower limit (<first target value Tct(1)) at time T(2), warm-up control is executed again.

Re-execution of warm-up control is not limited to the case where the temperature Tc of the catalyst 154 becomes lower than the predetermined lower limit. For example, warm-up control may be executed again when the low-load duration of the engine 10 exceeds a threshold after the end of warm-up control. The threshold of the low-load duration is calculated on the basis of the first target value Tct(1).

<Warm-Up Control 1 when Power Generation Mode is Selected>

Next, description will be made on the case where the power generation mode is selected as the control mode and the engine 10 is in a stopped state. Warm-up control is executed on the basis of the detected result of the catalyst temperature sensor 114.

Because the stopped state of the engine 10 continues, the state where the temperature Tc of the catalyst 154 is lower than the first target value Tct(1) and the second target value Tct(2) continues. When the power generation mode is selected and the engine 10 is in a stopped state, electric power of the battery 70 is consumed in the external electrical load 302. Therefore, the SOC of the battery 70 decreases.

Figure 6:
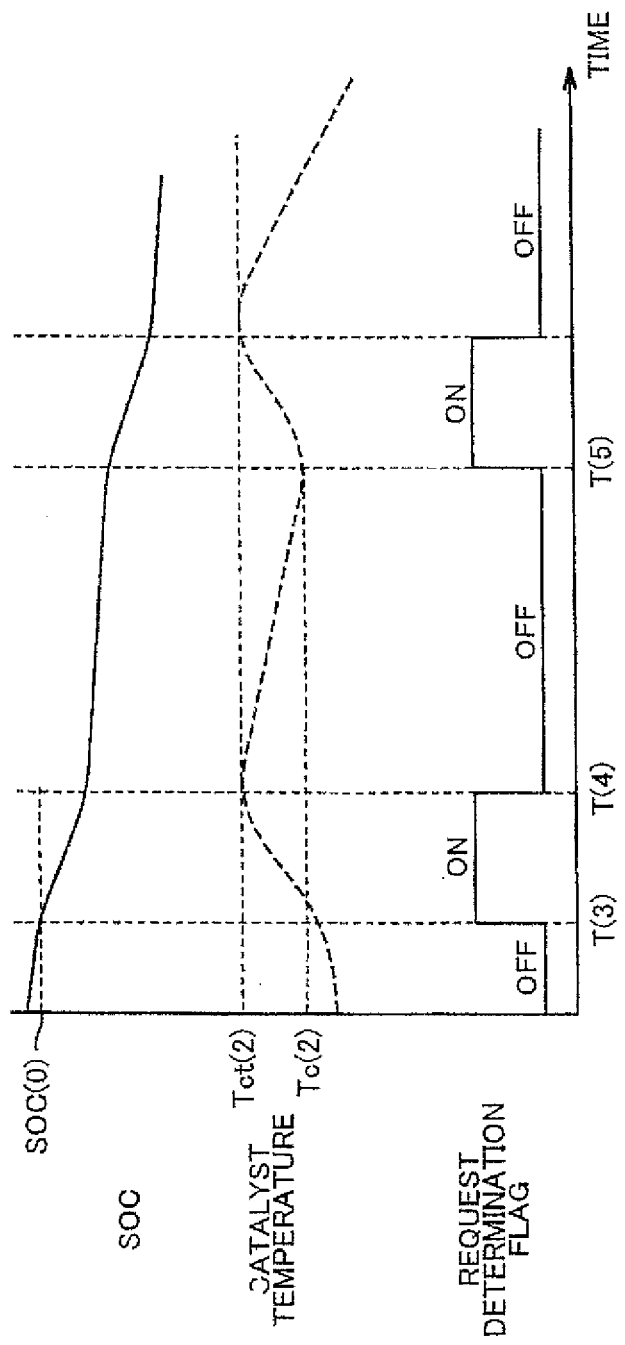
FIG. 6 is a timing chart for illustrating warm-up control that is executed on the basis of a catalyst temperature while a power generation mode is selected according to the embodiment.

As shown in FIG. 6, when the SOC of the battery 70 becomes lower than a threshold SOC(1) at time T(3), a start of the engine 10 is requested. At this time, when there is a request to warm up the catalyst 154 (YES in step S100) and the power generation mode is selected (No in step S102 and YES in step S104), the second target value Tct(2) is set for the target temperature Tct of the catalyst 154 (step S108). Then, warm-up control is executed such that the temperature Tc of the catalyst 154 becomes the set target temperature Tct (step S110).

The catalyst 154 is heated through execution of warm-up control, so the temperature Tc of the catalyst 154 rises. When the temperature Tc of the catalyst 154 reaches the second target value Tct(2) at time T(4), warm-up control ends. When warm-up control ends, the temperature Tc of the catalyst 154 decreases with a lapse of time due to heat radiation. When the temperature Tc of the catalyst 154 becomes lower than the predetermined lower limit (<second target value Tct(2)) at time T(5), warm-up control is executed again.

Re-execution of warm-up control is not limited to the case where the temperature Tc of the catalyst 154 is lower than the predetermined lower limit. For example, warm-up control may be executed again when the low-load duration of the engine 10 exceeds a threshold after the end of warm-up control. The threshold of the low-load duration is calculated on the basis of the second target value Tct(2).

<Warm-Up Control 2 when Travel Mode is Selected>

Description will be made on another example in which the travel mode is selected as the control mode and the engine 10 is in a stopped state. Warm-up control is executed on the basis of the threshold of the execution duration and the threshold of the low-load duration.

Because the stopped state of the engine 10 continues, the state where the temperature Tc of the catalyst 154 is lower than the first target value Tct(1) and the second target value Tct(2) continues. Electric power is consumed in the second MG 30 due to continuation of EV travel, so the SOC of the battery 70 decreases.

Figure 7:
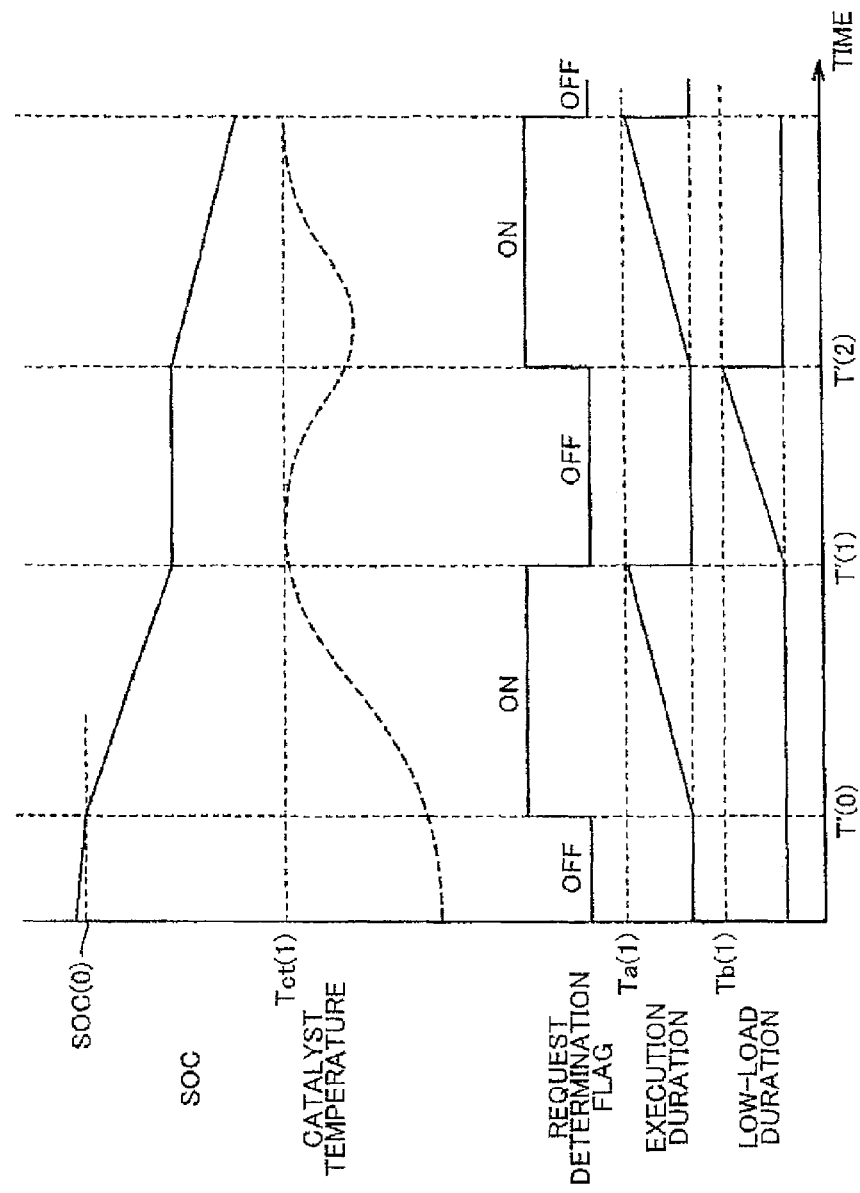
FIG. 7 is a timing chart for illustrating warm-up control that is executed on the basis of an execution duration and a low-load duration while the travel mode is selected according to the embodiment.

As shown in FIG. 7, when the SOC of the battery 70 becomes lower than the threshold SOC(0) at time T'(0), a start of the engine 10 is required. At this time, there is a request to warm up the catalyst 154 (YES in step S100) and the travel mode is selected (YES in step S102), so the first target value Tct(1) is set for the target temperature Tct of the catalyst 154 (step S106). Then, warm-up control is executed until an execution duration Ta(1) that is calculated on the basis of the set first target value Tct(1) elapses (step S110). The catalyst 154 is heated through execution of warm-up control, so the temperature Tc of the catalyst 154 rises.

When the execution duration elapses at time T'(1), warm-up control ends. At this time, the temperature Tc of the catalyst 154 is a temperature around the first target value Tct(1). When warm-up control ends and the low-load state of the engine 10 continues, the temperature Tc of the catalyst 154 decreases with a lapse of time due to heat radiation.

When the low-load duration elapses a threshold Tb(1) at time T'(2), warm-up control is executed again. The threshold Tb(1) of the low-load duration is calculated on the basis of the first target value Tct(1).

<Warm-Up Control 2 when Power Generation Mode is Selected>

Next, description will be made on another example in which the power generation mode is selected as the control mode and the engine 10 is in a stopped state. Warm-up control is executed on the basis of the execution duration and the threshold of the low-load duration.

Because the stopped state of the engine 10 continues, the state where the temperature Tc of the catalyst 154 is lower than the first target value Tct(1) and the second target value Tct(2) continues. When the power generation mode is selected and the engine 10 is in a stopped state, electric power of the battery 70 is consumed in the external electrical load 302. Therefore, the SOC of the battery 70 decreases.

Figure 8:
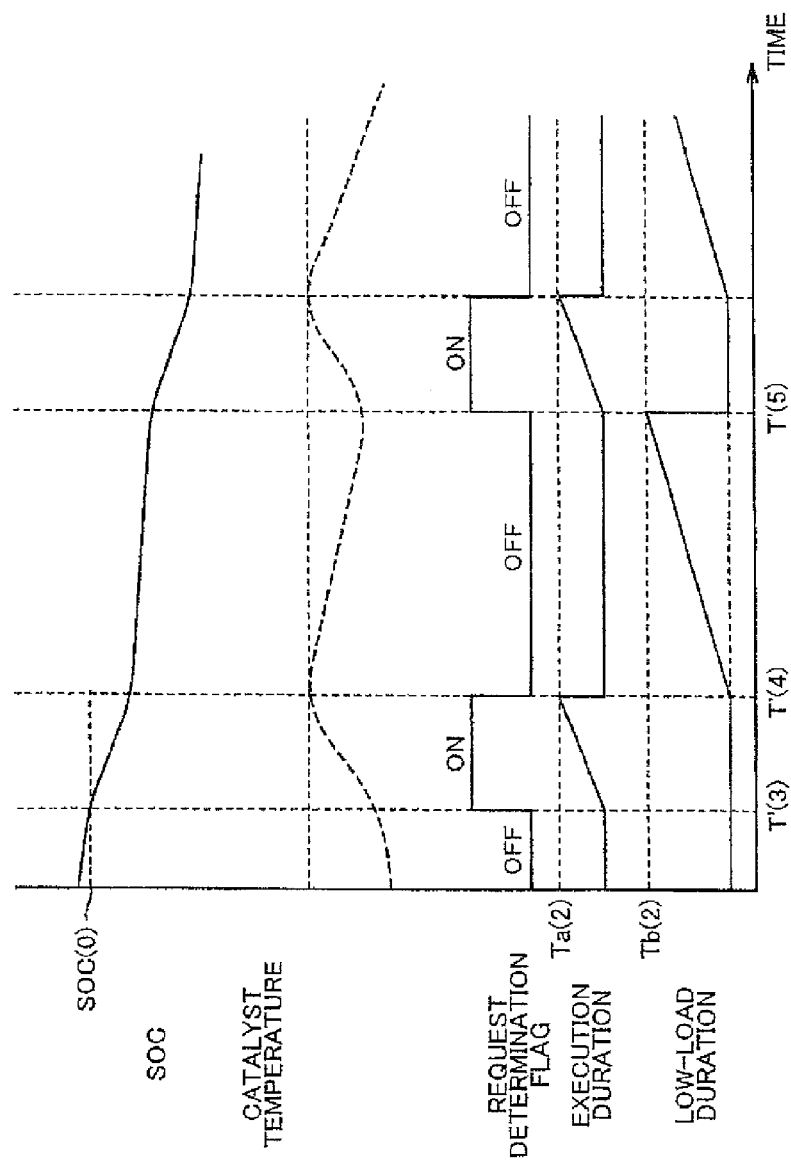
FIG. 8 is a timing chart for illustrating warm-up control that is executed on the basis of an execution duration and a low-load duration while the power generation mode is selected according to the embodiment.

As shown in FIG. 8, when the SOC of the battery 70 is lower than the threshold SOC(1) at time T'(3), a start of the engine 10 is requested. At this time, when there is a request to warm up the catalyst 154 (YES in step S100) and the power generation mode is selected (No in step S102 and YES in step S104), the second target value Tct(2) is set for the target temperature Tct of the catalyst 154 (step S108). Warm-up control is executed until an execution duration Ta(2) that is calculated on the basis of the set second target value Tct(2) elapses (step S110). The execution duration Ta(2) is shorter than the execution duration Ta(1) while the travel mode is selected. The catalyst 154 is heated through execution of warm-up control, so the temperature Tc of the catalyst 154 rises.

When the execution duration Ta(1) elapses at time T'(4), warm-up control ends. At this time, the temperature Tc of the catalyst 154 is a temperature around the second target value Tct(2). When warm-up control ends and the low-load state of the engine 10 continues, the temperature Tc of the catalyst 154 decreases with a lapse of time due to heat radiation.

When a threshold Tb(2) of the low-load duration, which is calculated on the basis of the set second target value Tct(2), elapses at time T'(5), warm-up control is executed again. The threshold Tb(2) of the low-load duration is longer than the threshold Tb(1) of the low-load duration while the travel mode is selected.

As described above, with the vehicle according to the present embodiment, when there is a request to warm up the catalyst 154 while the travel mode is selected, warm-up control is executed such that the temperature Tc of the catalyst 154 becomes the first target value Tct(1). When there is a request to warm up the catalyst 154 while the power generation mode is selected, warm-up control is executed such that the temperature Tc of the catalyst 154 becomes the second target value Tct(2) lower than the first target value Tct(1). Thus, at each of the time when the travel mode is selected and the time when the power generation mode is selected, the temperature Tc of the catalyst 154 is controlled to an appropriate temperature. Therefore, it is possible to suppress wasteful consumption of energy particularly in the case where warm-up control is executed while the power generation mode is selected. Thus, it is possible to appropriately control the temperature of the catalyst on the basis of the state of the vehicle.

In the present embodiment, the description is made on the case where warm-up control is executed on the basis of the detected result of the catalyst temperature sensor 114 and the case where warm-up control is executed on the basis of the execution duration and the threshold of the low-load duration; however, warm-up control is not limited to these cases. For example, warm-up control may be executed on the basis of the amount of electric power consumed in the EHC 110.

For example, the ECU 200 may execute warm-up control from when warm-up control is started to when the amount of electric power consumed in the EHC 110 becomes larger than or equal to a first value while the travel mode is selected. Meanwhile, the ECU 200 may execute warm-up control from when warm-up control is started to when the amount of electric power consumed in the EHC 110 becomes larger than or equal to a second value while the power generation mode is selected. The second value is smaller than the first value. In addition, the first value is calculated on the basis of the first target value Tct(1), and the second value is calculated on the basis of the second target value Tct(2).

The embodiment of the invention is illustrative and not restrictive in all respects. The scope of the invention is defined by the appended claims. The scope of the invention is intended to encompass all modifications within the scope of the appended claims and equivalents thereof.

What is claimed is:
1. A vehicle comprising:
an electrical storage device configured to supply electric power to a power receiving system outside the vehicle;
a power generating device configured to supply electric power to the electrical storage device and the power receiving system;

an engine that is a power source of the power generating device and that has a catalyst for purifying exhaust gas; and an electronic control unit configured to control the vehicle such that a catalyst temperature becomes a first target value when there is a request to warm up the catalyst while the vehicle is travelling, and the electronic control unit configured to control the vehicle such that catalyst temperature becomes a second target value different from the first target value when there is a request to warm up the catalyst while electric power is being supplied to the power receiving system, wherein the second target value is lower in temperature than the first target value.

2. The vehicle according to claim 1, wherein the first target value is the catalyst temperature required to purify the exhaust gas in an amount corresponding to an upper limit of an intake air flow rate of the engine while the vehicle is travelling.

3. The vehicle according to claim 1, wherein the second target value is the catalyst temperature required to purify the exhaust gas in an amount corresponding to an upper limit of an intake air flow rate of the engine while electric power is being supplied to the power receiving system.

4. The vehicle according to claim 1, wherein the electronic control unit is configured to determine that there is a request to warm up the catalyst when a state of charge of the electrical storage device is lower than a threshold.

5. The vehicle according to claim 1, wherein the electronic control unit is configured to determine that there is a request to warm up the catalyst when a low-load state of the engine continues until a lapse of time after an end of warm-up of the catalyst is longer than or equal to a threshold.

6. The vehicle according to claim 1, further comprising:
an electric motor configured to drive the vehicle, wherein
the electronic control unit is configured to determine that there is a request to warm up the catalyst when there is a request to start the engine while the vehicle is driven with the use of the electric motor in a state where the engine is stopped.

7. The vehicle according to claim 1, further comprising:
a detecting unit configured to detect the catalyst temperature, wherein
the electronic control unit is configured to determine that there is a request to warm up the catalyst when the engine is in operation and the catalyst temperature detected by the detecting unit is lower than a threshold.

8. The vehicle according to claim 1, further comprising:
a drive wheel;
a second rotating electrical machine configured to rotate the drive wheel; and
a power transmission device configured to mechanically couple three elements, that is, an output shaft of the engine, a rotary shaft of a first rotating electrical machine that is the power generating device and a rotary shaft of the second rotating electrical machine, to each other, and the power transmission device configured to set any one of the three elements as a reaction element to thereby transmit power between the other two elements.

9. A vehicle control method that is used in a vehicle including: an electrical storage device configured to supply electric power to an external power receiving system; a power generating device configured to supply electric power to the electrical storage device and the power receiving system; and an engine that is a power source of the power generating device and that has a catalyst, comprising:
controlling, via an electronic control unit, the vehicle such that a catalyst temperature becomes a first target value when there is a request to warm up the catalyst while the vehicle is travelling; and
controlling, via the electronic control unit, the vehicle such that the catalyst temperature becomes a second target value different from the first target value when there is a request to warm up the catalyst while electric power is being supplied to the power receiving system, wherein the second target value is lower in temperature than the first target value.

* * * * *